(12) United States Patent
Berggren et al.

(10) Patent No.: US 8,708,847 B2
(45) Date of Patent: Apr. 29, 2014

(54) SPORT BALL CASING AND METHODS OF MANUFACTURING THE CASING

(75) Inventors: Scott R. Berggren, Portland, OR (US);
Scott W. Johnson, Beaverton, OR (US);
Vincent F. White, Beaverton, OR (US);
Eleazar C. Chavez, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 150 days.

(21) Appl. No.: 13/170,912

(22) Filed: Jun. 28, 2011

(65) Prior Publication Data
US 2012/0258824 A1    Oct. 11, 2012

Related U.S. Application Data

(63) Continuation-in-part of application No. 12/147,874, filed on Jun. 27, 2008, now Pat. No. 8,182,379.

(51) Int. Cl.
*A63B 41/08* (2006.01)

(52) U.S. Cl.
USPC ................ 473/604; 473/605; 473/607

(58) Field of Classification Search
USPC .......... 473/598, 599, 600–605, 593, 594, 596, 473/597, 607
See application file for complete search history.

(56) References Cited

U.S. PATENT DOCUMENTS

| | | | |
|---|---|---|---|
| 414,748 A | 11/1889 | Bentley | |
| 1,187,029 A * | 6/1916 | Beebout | 473/604 |
| 1,517,859 A | 12/1924 | O'Shea | |
| 1,575,281 A | 3/1926 | Rosenberg | |
| 1,917,535 A | 7/1933 | Maynard | |
| 1,923,236 A * | 8/1933 | Sonnett | 473/599 |
| 1,932,226 A | 10/1933 | Pierce | |
| 1,967,908 A | 7/1934 | Sneary | |
| 2,012,376 A | 8/1935 | Caro | |
| 2,018,559 A | 10/1935 | Horner | |
| 2,080,894 A | 5/1937 | Levinson | |
| 2,126,220 A | 8/1938 | Scudder | |
| 2,149,465 A | 3/1939 | Riddell | |
| 2,214,179 A | 9/1940 | Reach | |

(Continued)

FOREIGN PATENT DOCUMENTS

| | | |
|---|---|---|
| BE | 535426 | 2/1955 |
| DE | 1169820 | 5/1964 |

(Continued)

OTHER PUBLICATIONS

International Search Report and Written Opinion in PCT Application No. PCT/US2012/043700, mailed on Oct. 19, 2012.

(Continued)

*Primary Examiner* — Steven Wong
(74) *Attorney, Agent, or Firm* — Plumsea Law Group, LLC

(57) ABSTRACT

A sport ball may include a casing and a bladder. The casing includes a plurality of panels having edge areas joined to each other with bonds, and the edge areas project toward an exterior of the ball. The bladder is located within the casing. In another aspect, the casing includes a first panel and a second panel that each have an exterior surface facing outward and an opposite interior surface facing inward. The interior surface of the first panel is bonded to the interior surface of the second panel to form a seam that joins the first panel and the second panel together. A method of manufacturing the casing may include forming thermal bonds between the panels.

23 Claims, 15 Drawing Sheets

(56) References Cited

U.S. PATENT DOCUMENTS

| | | | |
|---|---|---|---|
| 2,244,503 A | 6/1941 | Riddell | |
| 2,280,314 A * | 4/1942 | Scudder | 473/604 |
| 2,300,441 A | 11/1942 | Voit et al. | |
| 2,325,073 A | 7/1943 | Reach | |
| 2,344,638 A | 3/1944 | Reeder | |
| 2,623,747 A | 12/1952 | Crowley | |
| 2,653,818 A * | 9/1953 | Tebbetts, Jr. et al. | 473/604 |
| 2,945,693 A | 7/1960 | Way | |
| 3,508,750 A * | 4/1970 | Henderson | 473/605 |
| 3,512,777 A | 5/1970 | Henderson | |
| 4,154,789 A | 5/1979 | Delacoste | |
| 4,219,945 A | 9/1980 | Rudy | |
| 4,258,917 A | 3/1981 | Murphy | |
| 4,310,978 A | 1/1982 | Stern | |
| 4,436,276 A | 3/1984 | Donahue | |
| 4,462,590 A * | 7/1984 | Mitchell | 473/603 |
| 4,513,058 A | 4/1985 | Martin | |
| 4,610,071 A | 9/1986 | Miller | |
| 4,660,831 A * | 4/1987 | Kralik | 473/603 |
| 4,936,029 A | 6/1990 | Rudy | |
| 5,042,176 A | 8/1991 | Rudy | |
| D322,105 S | 12/1991 | Ma | |
| 5,069,935 A * | 12/1991 | Walters | 473/599 |
| 5,096,756 A | 3/1992 | Walters | |
| 5,123,659 A | 6/1992 | Williams | |
| 5,181,717 A | 1/1993 | Donntag et al. | |
| 5,250,070 A | 10/1993 | Parodi | |
| 5,306,001 A | 4/1994 | Shishido et al. | |
| 5,494,625 A | 2/1996 | Hu | |
| 5,503,699 A | 4/1996 | Ratner et al. | |
| 5,542,662 A * | 8/1996 | Kouzai et al. | 473/605 |
| 5,580,049 A | 12/1996 | Brantley | |
| 5,603,497 A | 2/1997 | Louez | |
| 5,681,233 A | 10/1997 | Guenther et al. | |
| 5,713,141 A | 2/1998 | Mitchell et al. | |
| 5,752,890 A | 5/1998 | Shishido et al. | |
| 5,772,545 A * | 6/1998 | Ou | 473/605 |
| 5,888,157 A | 3/1999 | Guenther et al. | |
| 5,931,752 A | 8/1999 | Guenther et al. | |
| 5,952,065 A | 9/1999 | Mitchell et al. | |
| 6,012,997 A | 1/2000 | Mason | |
| 6,013,340 A | 1/2000 | Bonk et al. | |
| 6,024,661 A | 2/2000 | Guenther et al. | |
| 6,082,025 A | 7/2000 | Bonk et al. | |
| 6,127,026 A | 10/2000 | Bonk et al. | |
| 6,142,897 A | 11/2000 | Lees | |
| 6,203,868 B1 | 3/2001 | Bonk et al. | |
| 6,261,400 B1 | 7/2001 | Kennedy, III | |
| 6,302,815 B1 * | 10/2001 | Shishido et al. | 473/604 |
| 6,321,465 B1 | 11/2001 | Bonk et al. | |
| 6,406,389 B1 | 6/2002 | Feeney et al. | |
| 6,422,961 B1 | 7/2002 | Feeney | |
| 6,461,461 B2 | 10/2002 | Kennedy, III | |
| 6,503,162 B1 | 1/2003 | Shishido et al. | |
| 6,629,902 B2 | 10/2003 | Murphy et al. | |
| 6,645,099 B2 | 11/2003 | Gaff et al. | |
| 6,685,585 B2 | 2/2004 | Shishido et al. | |
| 6,726,582 B1 | 4/2004 | Kuo et al. | |
| 6,971,965 B1 * | 12/2005 | Shishido | 473/604 |
| 6,991,569 B2 | 1/2006 | Dobrounig | |
| 7,005,025 B2 | 2/2006 | Summers | |
| 7,029,407 B2 | 4/2006 | Lee et al. | |
| 7,066,853 B2 | 6/2006 | Chang | |
| 2,073,766 A1 | 10/2008 | Suzuki | |
| 7,749,116 B2 * | 7/2010 | Tang et al. | 473/604 |
| 7,753,813 B2 | 7/2010 | Taniguchi et al. | |
| 7,854,815 B2 | 12/2010 | Taniguchi et al. | |
| 8,182,379 B2 * | 5/2012 | Rapaport et al. | 473/603 |
| 2001/0002378 A1 * | 5/2001 | Calandro | 473/599 |
| 2002/0086749 A1 | 7/2002 | Ou | |
| 2002/0098928 A1 | 7/2002 | Ou | |
| 2003/0078119 A1 * | 4/2003 | Shishido et al. | 473/605 |
| 2003/0176246 A1 | 9/2003 | Gaff et al. | |
| 2003/0203780 A1 | 10/2003 | Guenther et al. | |
| 2004/0077288 A1 | 4/2004 | Krysiak et al. | |
| 2004/0144477 A1 | 7/2004 | Taniguchi et al. | |
| 2004/0229722 A1 | 11/2004 | Liu | |
| 2005/0081982 A1 | 4/2005 | Chen | |
| 2005/0153803 A1 | 7/2005 | Swiszcz et al. | |
| 2005/0229985 A1 | 10/2005 | Saxenfelt | |
| 2006/0063622 A1 | 3/2006 | Nurnberg et al. | |
| 2006/0148601 A1 | 7/2006 | Ou | |
| 2006/0199685 A1 | 9/2006 | Ou | |
| 2006/0205544 A1 | 9/2006 | Wyner et al. | |
| 2006/0205547 A1 | 9/2006 | O'Neill et al. | |
| 2006/0229149 A1 | 10/2006 | Goedoen | |
| 2006/0229150 A1 | 10/2006 | Ou | |
| 2006/0293132 A1 | 12/2006 | Laliberty et al. | |
| 2007/0049434 A1 | 3/2007 | Maziarz et al. | |
| 2007/0072712 A1 | 3/2007 | Chernick et al. | |
| 2007/0129188 A1 | 6/2007 | Maziarz et al. | |
| 2007/0225094 A1 | 9/2007 | Nix | |
| 2007/0246296 A1 | 10/2007 | Xiao et al. | |
| 2008/0176685 A1 | 7/2008 | Madore et al. | |
| 2008/0287230 A1 * | 11/2008 | Guenther et al. | 473/596 |
| 2009/0011878 A1 | 1/2009 | Ou | |
| 2009/0209374 A1 | 8/2009 | Ou | |
| 2009/0325740 A1 | 12/2009 | Krysiak | |
| 2009/0325744 A1 | 12/2009 | Raynak | |
| 2010/0240479 A1 | 9/2010 | Raynak | |
| 2011/0152018 A1 * | 6/2011 | Walling et al. | 473/614 |
| 2011/0250997 A1 * | 10/2011 | Walling et al. | 473/613 |
| 2012/0202627 A1 | 8/2012 | Raynak et al. | |
| 2012/0258824 A1 | 10/2012 | Berggren et al. | |
| 2013/0005521 A1 | 1/2013 | White et al. | |

FOREIGN PATENT DOCUMENTS

| | | | |
|---|---|---|---|
| DE | 102004056951 A1 | 6/2006 | |
| EP | 0598542 | 5/1994 | |
| EP | 0941749 A1 | 9/1999 | |
| EP | 1 080 745 A1 | 3/2001 | |
| FR | 2572674 | 5/1986 | |
| JP | 10337341 | 12/1998 | |
| WO | 2004/056424 A1 | 7/2004 | |
| WO | WO2004056424 | 7/2004 | |
| WO | 2007/146095 A1 | 12/2007 | |
| WO | 2009/158103 A1 | 12/2009 | |
| WO | WO2009158103 A1 | 12/2009 | |
| WO | WO2011028640 A1 | 3/2011 | |
| WO | 2013/003221 A1 | 1/2013 | |
| WO | 2013003221 A1 | 1/2013 | |
| WO | 2013148947 | 10/2013 | |

OTHER PUBLICATIONS

International Search Report and Written Opinion dated Oct. 6, 2009 from International Application No. PCT/US2009/045393.

Office Action mailed Jun. 27, 2012 in U.S. Appl. No. 13/451,206.

Amendment filed Sep. 20, 2012 in response to Office Action mailed Jun. 27, 2012 in U.S. Appl. No. 13/451,206.

Final Office Action mailed Oct. 31, 2012 in U.S. Appl. No. 13/451,206.

Amendment filed Jan. 31, 2013 in response to Final Office Action mailed Oct. 31, 2012 in U.S. Appl. No. 13/451,206.

Office Action mailed May 30, 2013 in U.S. Appl. No. 13/451,206.

Office Action mailed Mar. 10, 2010 in U.S. Appl. No. 12/147,874.

Amendment filed Jun. 4, 2010 in response to Office Action mailed Mar. 10, 2010 in U.S. Appl. No. 12/147,874.

Office Action mailed Aug. 19, 2010 in U.S. Appl. No. 12/147,874.

Amendment filed Nov. 19, 2010 in response to Office Action mailed Aug. 19, 2010 in U.S. Appl. No. 12/147,874.

Final Office Action mailed Jan. 25, 2011 in U.S. Appl. No. 12/147,874.

Amendment filed Mar. 22, 2011 in response to Final Office Action mailed Jan. 25, 2011 in U.S. Appl. No. 12/147,874.

Amendment filed Apr. 19, 2011 with RCE in response to Office Action mailed Jan. 25, 2011 in U.S. Appl. No. 12/147,874.

(56) References Cited

OTHER PUBLICATIONS

Office Action mailed Sep. 6, 2011 in U.S. Appl. No. 12/147,874.
Amendment filed Dec. 1, 2011 in response to Office Action mailed Sep. 6, 2011 in U.S. Appl. No. 12/147,874.
Notice of Allowance mailed Jan. 23, 2012 in U.S. Appl. No. 12/147,874.
Amendment filed Aug. 29, 2013 in response to Office Action mailed May 30, 2013 in U.S. Appl. No. 13/451,206.
Office Action mailed Oct. 15, 2013 in U.S. Appl. No. 13/451,206.
Claims filed in European Application No. 12748284.2 on Jan. 21, 2014.
International Search Report and Written Opinion dated Dec. 13, 2013 cited in PCT/US2013/034276.
Restriction Requirement mailed Nov. 27, 2013 in U.S. Appl. No. 13/434,897.
Response to Restriction Requirement filed Dec. 27, 2013 in U.S. Appl. No. 13/434,897.
Amendment filed Dec. 27, 2013 in U.S. Appl. No. 13/451,206.

\* cited by examiner

US 8,708,847 B2

SPORT BALL CASING AND METHODS OF MANUFACTURING THE CASING

CROSS-REFERENCE TO RELATED APPLICATION

This application is a continuation-in-part (CIP) of nonprovisional application Ser. No. 12/147,874, filed 27 Jun. 2008, now U.S. Pat. No. 8,182,379.

BACKGROUND

A variety of inflatable sport balls, such as soccer balls, conventionally exhibit a layered structure that includes a casing, a restriction structure, and a bladder. The casing forms an exterior portion of the sport ball and is generally formed from a plurality of durable and wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape.

The restriction structure forms a middle portion of the sport ball and is positioned between the casing and the bladder. Among other purposes, the restriction structure may provide a softened feel to the sport ball, impart energy return, and restrict expansion of the bladder. In some configurations, the restriction structure or portions of the restriction structure may be bonded, joined, or otherwise incorporated into the casing as a backing material.

The bladder, which has an inflatable configuration, is located within the restriction structure to provide an interior portion of the sport ball. In order to facilitate inflation (i.e., with pressurized air), the bladder generally includes a valved opening that extends through each of the restriction structure and casing, thereby being accessible from an exterior of the sport ball.

SUMMARY

A sport ball is disclosed below as including a casing and a bladder. The casing includes a plurality of panels having edge areas joined to each other with bonds, and the edge areas project toward an exterior of the ball. The bladder is located within the casing. In another aspect, the casing includes a first panel and a second panel that each have an exterior surface facing outward and an opposite interior surface facing inward. The interior surface of the first panel is bonded to the interior surface of the second panel to form a seam that joins the first panel and the second panel together.

A method of manufacturing a sport ball is also disclosed below. The method includes providing at least a first panel and a second panel that each have a first surface and an opposite second surface. The first panel is joined to the second panel by (a) locating the second surface of the first panel against the second surface of the second panel and (b) forming a bond that joins the second surface of the first panel to the second surface of the second panel. In addition, the first panel and the second panel are oriented such that (a) the first surface of the first panel and the first surface of the second panel face outward and toward an exterior of the sport ball and (b) the second surface of the first panel and the second surface of the second panel face inward and toward an interior of the sport ball.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose a sport ball and method for manufacturing of the sport ball. Although the sport ball is discussed and depicted as being a soccer ball, concepts associated with the sport ball and method for manufacturing may be applied to various types of inflatable sport balls. In addition to soccer balls, therefore, concepts discussed herein may be incorporated into basketballs, footballs (for either American football or rugby), volleyballs, and water polo balls, for example. A variety of non-inflatable sport balls, such as baseballs and softballs, may also incorporate concepts discussed herein.

Sport Ball Configuration

Figure 1:
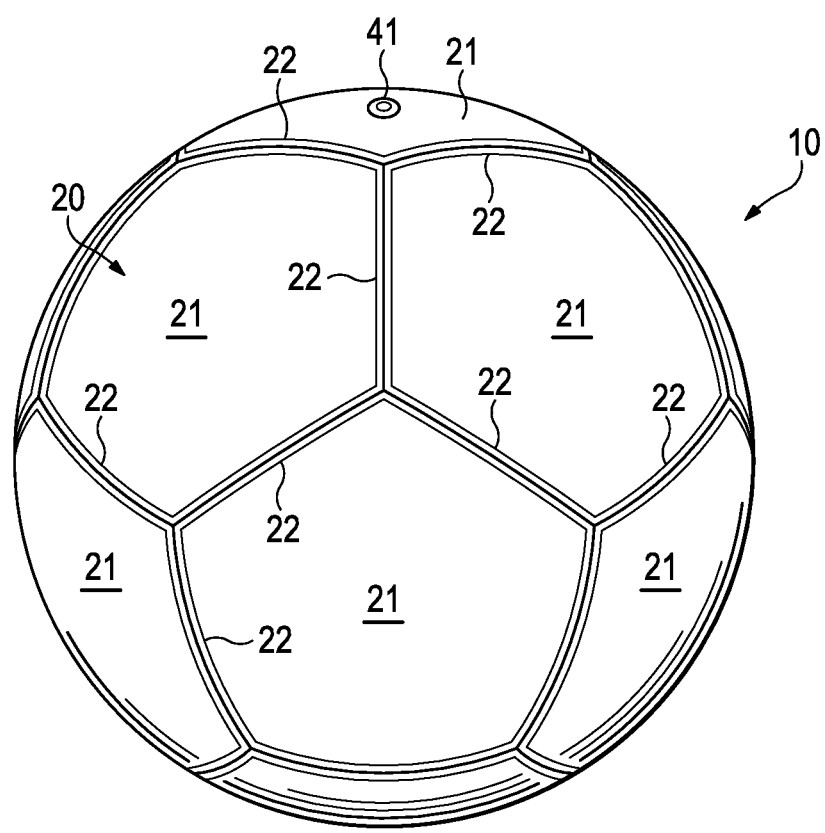
FIG. 1 is a perspective view of a sport ball.
Figure 2:
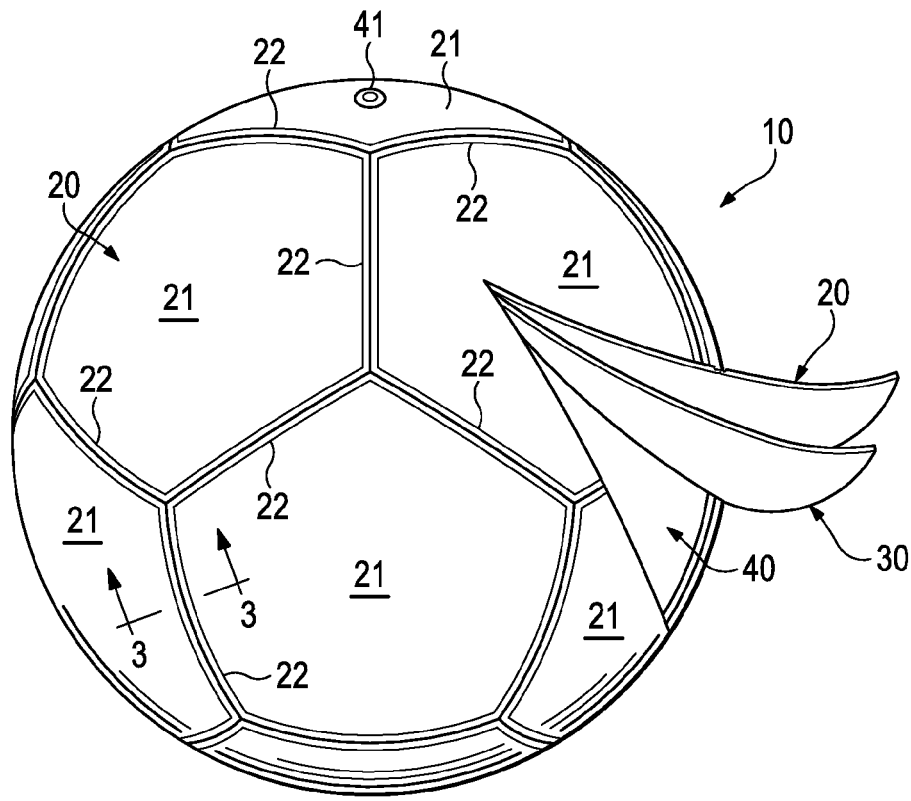
FIG. 2 is another perspective view of the sport ball.
Figure 3:
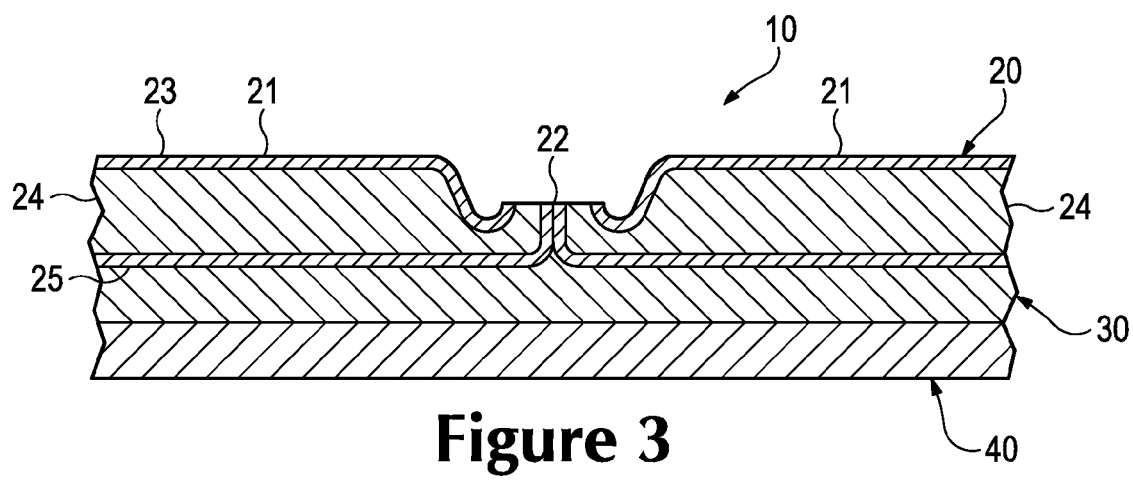
FIG. 3 is a cross-sectional view of a portion of the sport ball, as defined by section line 3-3 in FIG. 2.

A sport ball 10 having the general configuration of a soccer ball is depicted in FIGS. 1-3. Sport ball 10 exhibits a layered structure having (a) a casing 20 that forms an exterior portion of sport ball 10, (b) a restriction structure 30 located within casing 20 and forming an intermediate portion of sport ball 10, and (c) a bladder 40 that is inflatable and forms an interior portion of sport ball 10. Upon pressurization, bladder 40 induces sport ball 10 to take on a substantially spherical shape. More particularly, pressure within bladder 40 causes bladder 40 to place an outward force upon restriction structure 30. In turn, restriction structure 30 places an outward force upon casing 20. In order to limit expansion of bladder 40 and also limit tension in casing 20, restriction structure 30 may have a limited degree of stretch. In other words, bladder 40 places an outward force upon restriction structure 30, but the stretch characteristics of restriction structure 30 effectively prevent the outward force from inducing significant tension in casing 20. As such, restriction structure 30 restrains pressure from bladder 40, while permitting outward forces to induce a spherical shape in casing 20, thereby imparting a spherical shape to sport ball 10.

Casing 20 is formed from various panels 21 that are joined together along abutting sides or edges to form a plurality of seams 22. That is, edge areas of panels 21 are joined to each other to form seams 22. Although panels 21 are depicted as having the shapes of twelve equilateral pentagons, panels 21 may have non-equilateral shapes, concave or convex edges, or a variety of other shapes (e.g., triangular, square, rectangular, hexagonal, trapezoidal, round, oval, non-geometrical) that combine in a tessellation-type manner to form casing 20. In some configurations, sport ball 10 may have twelve pentagonal panels 21 and twenty hexagonal panels 21 to impart the general configuration of a traditional soccer ball. Selected panels 21 may also be formed of unitary (i.e., one piece) construction with adjacent panels 21 to form bridged panels that reduce the number of seams 22. Accordingly, the configuration of casing 20 may vary significantly.

The materials selected for casing 20 may include leather, synthetic leather, polyurethane, polyvinyl chloride, and other materials that are generally durable and wear-resistant. In many configurations, each of panels 21 may be formed from a single material, such as layer of synthetic leather. In some configurations, however, each of panels 21 may have a layered configuration that combines two or more materials. For example, FIG. 3 depicts casing 20 as having a layered structure that includes an outer layer 23, a middle layer 24, and an inner layer 25. Although the materials selected for layers 23-25 may vary considerably, outer layer 23 may be formed from synthetic leather, middle layer 24 may be formed from a polymer foam material, and inner layer 25 may be a textile (e.g., a woven, non-woven, or knit textile). Accordingly, various materials and combinations of materials may be utilized in casing 20.

A distinction between conventional casings and casing 20 relates to the manner in which panels 21 are joined to form seams 22. The panels of conventional sport balls are often joined with stitching (e.g., hand or machine stitching). In contrast, a bonding process (e.g., adhesive bonding or thermal bonding) is utilized in the manufacture of sport ball 10 to join panels 21 and form seams 22. An example of the configuration of seams 22 is depicted in the cross-section of FIG. 3, wherein the bonding process has effectively secured, adhered, welded, or otherwise joined two of panels 21 to each other. Although the bonding process may be utilized to form all of seams 22, some of panels 21 may be joined through stitching or other processes, or various seams 22 that are formed through the bonding process may be supplemented with stitching.

The configuration of seams 22 varies from conventional seams in another aspect. In many sport balls, seams effectively protrude inward. That is, portions of panels that form an exterior surface lay against each other, are joined to each other, and curve inward form seams that extend into the sport ball. In contrast, seams 22 effectively curve outward, thereby protruding outward. Referring again to FIG. 3, inner layers 25, which form an interior surface of casing 20, lay against each other and are joined to each other. That is, the interior surfaces of panels 21 lay against each other and are joined to each other to form seams 22, which have an outwardly-protruding configuration. Additionally, the configuration of seams 22 exposes a portion of an edge of each panel 21 on the exterior of sport ball 10. That is, the edges of panels 21 form a portion of an outer surface of sport ball 10 at seams 22.

One advantage of utilizing a bonding process to form seams 22 relates to the overall mass of sport ball 10. Whereas approximately ten to fifteen percent of the mass of a conventional sport ball may be from the seams between panels, bonding panels 21 may reduce the mass at seams 22. By eliminating stitched seams in casing 20, the mass that would otherwise be imparted by the stitched seams may be utilized for other structural elements that enhance the performance properties (e.g., energy return, sphericity, mass distribution, durability, aerodynamics) of sport ball 10. Another advantage relates to manufacturing efficiency. Stitching each of the seams of a conventional sport ball is a relatively time-consuming process, particularly when hand stitching is utilized. By bonding panels 21 together at seams 22, the time necessary for forming casing 20 may be deceased, thereby increasing the overall manufacturing efficiency.

Restriction structure 30 forms a middle layer of sport ball 10 and is positioned between casing 20 and bladder 40. In general, restriction structure 30 is formed from materials with a limited degree of stretch in order to restrict expansion of bladder 40, but may have a variety of configurations or purposes. As examples, restriction structure 30 may be formed from (a) a thread, yarn, or filament that is repeatedly wound around bladder 40 in various directions to form a mesh that covers substantially all of bladder 40, (b) a plurality of generally flat or planar textile elements stitched together to form a structure that extends around bladder 40, (c) a plurality of generally flat or planar textile strips that are impregnated with latex and placed in an overlapping configuration around bladder 40, or (d) a substantially seamless spherically-shaped textile. In some configurations of sport ball 10, restriction structure 30 may also be bonded, joined, or otherwise incorporated into either of casing 20 and bladder 40, or restriction structure 30 may be absent from sport ball 10. Accordingly, the construction of restriction structure 30 may vary significantly to include a variety of configurations and materials.

Bladder 40 has an inflatable configuration and is located within restriction structure 30 to provide an inner portion of sport ball 10. When inflated, bladder 40 exhibits a rounded or generally spherical shape. In order to facilitate inflation, bladder 40 includes a valve 41 that extends through restriction structure 30 and casing 20, thereby being accessible from an exterior of sport ball 10. In other configurations, bladder 40 may have a valveless structure that is semi-permanently inflated. Bladder 40 may be formed from a variety of materials, including rubber, carbon latex, polyurethane, urethane, polyester, polyester polyurethane, polyether polyurethane, and mixtures or layered configurations thereof, for example. Although these materials are effective in preventing air or other fluids within bladder 40 from transmitting or diffusing to the exterior of sport ball 10, U.S. Pat. Nos. 5,713,141 and 5,952,065 to Mitchell, et al., both of which are incorporated herein by reference, disclose materials that may substantially prevent transmission or diffusion. Although various configurations may be utilized, this material generally includes a first layer of thermoplastic polymer material and a second layer of barrier material. The thermoplastic polymer material provides the ability to form bonds between elements of the material, as well as a suitable degree of tensile strength, tear strength, flexural fatigue strength, modulus of elasticity, and abrasion resistance. The barrier material is effective in limiting the transmission of the fluid within bladder 40 (e.g., nitrogen). In some configurations, the thermoplastic polymer material may be a thermoplastic urethane. Moreover, the thermoplastic urethane may be selected from a group including polyester, polyether, polycaprolactone, polyoxypropylene and polycarbonate macroglycol based materials, and mixtures thereof. In some configurations, the barrier material may be selected from a group including ethylene-vinyl alcohol copolymer, polyvinylidene chloride, co-polymers of acrylonitrile and methyl acrylate, polyesters such as polyethyleneterephthalate, aliphatic and aromatic polyamides, liquid crystal polymers, and polyurethane engineering thermoplastics. Accordingly, bladder 40 may be formed from a variety of materials.

Panel Bonding Process

Figure 4:
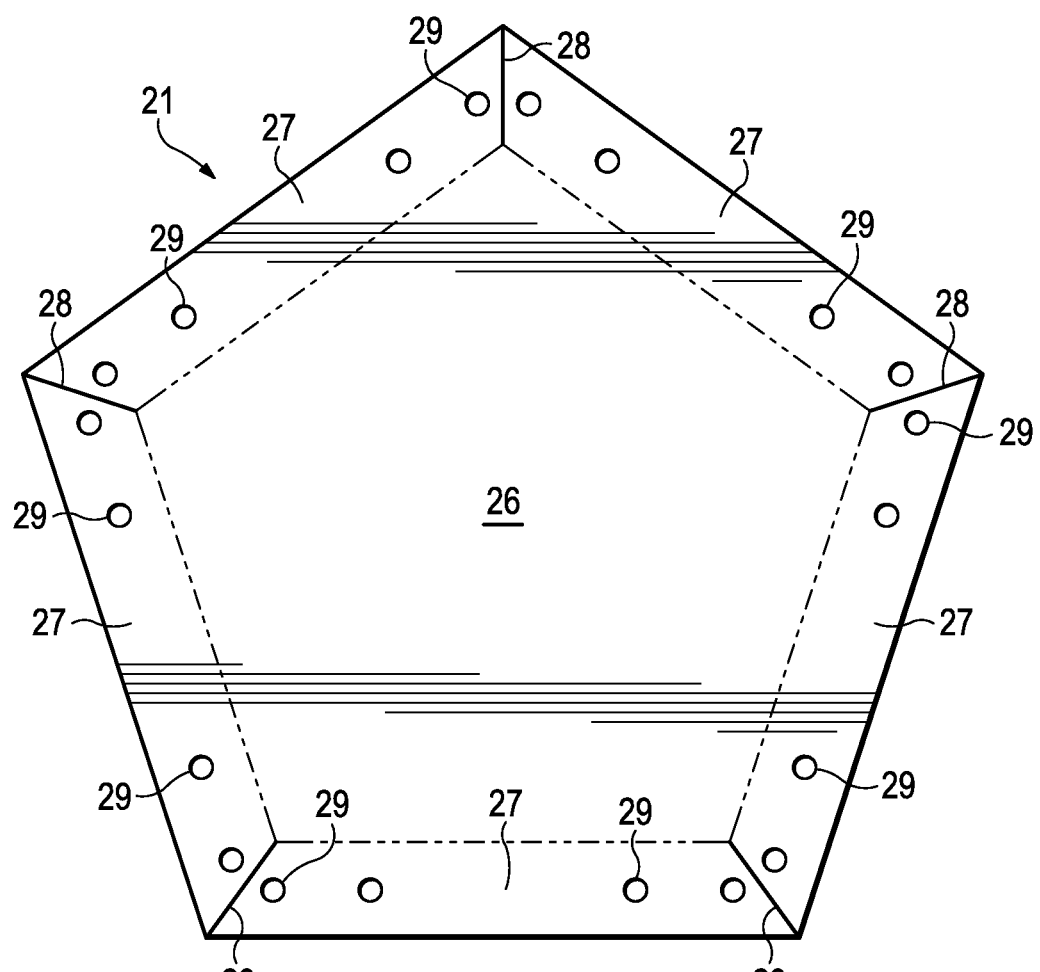
FIG. 4 is a top plan view of a panel of the sport ball.

The panels of conventional sport balls, as discussed above, may be joined with stitching (e.g., hand or machine stitching). Panels 21 are, however, joined through a bonding process. Referring to FIG. 4, one of panels 21 prior to being incorporated into sport ball 10 is depicted as having a panel area 26 and five flange areas 27. Whereas panel area 26 generally forms a central portion of panel 21, flange areas 27 form a peripheral portion of panel 21 and extend around panel area 26. For purposes of reference, dashed lines are depicted as extending between panel area 26 and the various flange areas 27. Panel 21 has a pentagonal shape and each of flange areas 27 correspond with one side region of the pentagonal shape. In further configurations where a panel has a different shape, the number of flange areas may change to correspond with the number of sides of the shape. Panel 21 defines five incisions 28 that extend inward from vertices of the pentagonal shape and effectively separate the various flange areas 27 from each other. Incisions 28 extend entirely through the thickness of panels 21 to disconnect flange areas 25 from each other and permit flange areas 27 to flex or otherwise move independent of each other, although flange areas 27 remain connected to panel area 26. Additionally, each flange area 27 defines various registration apertures 29 that form holes extending through panel 21.

Figure 5:
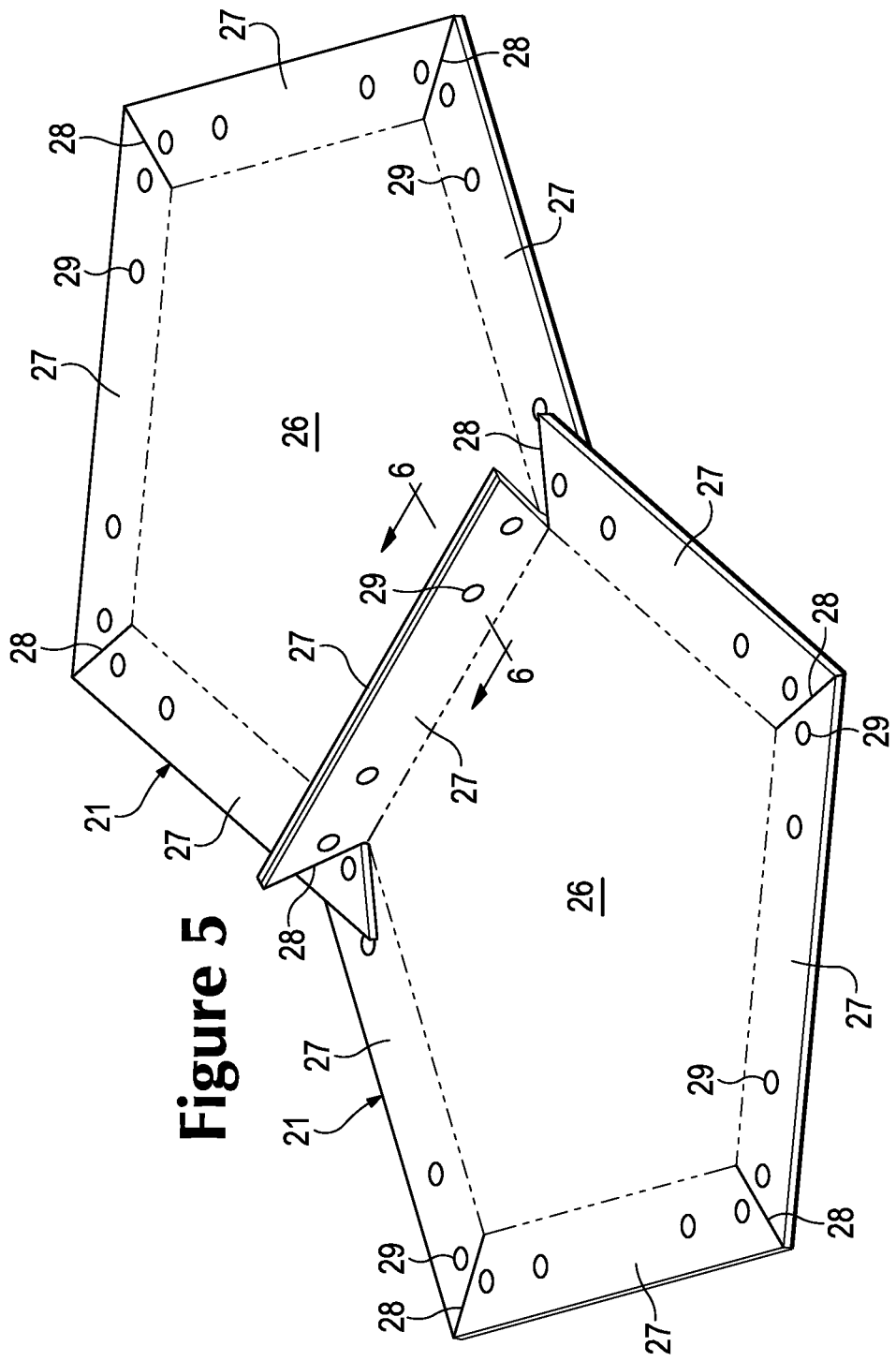
FIG. 5 is a perspective view of two joined panels.
Figure 6:
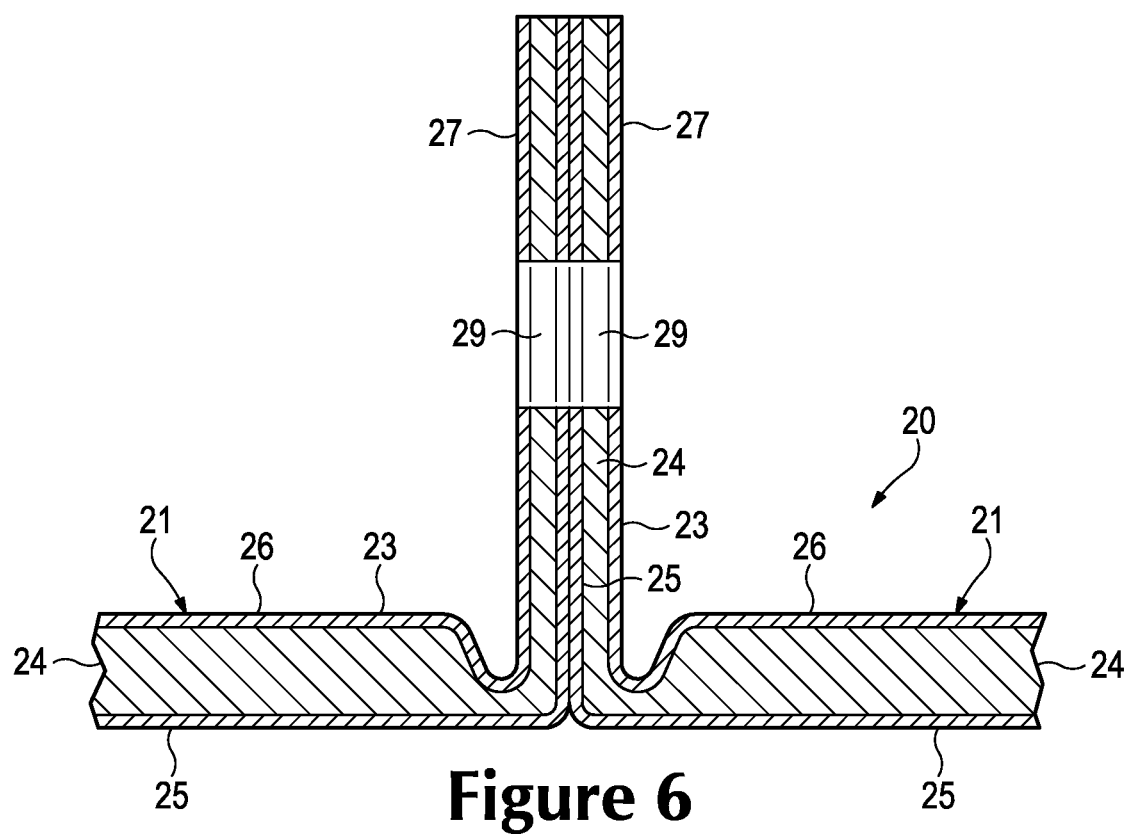
FIG. 6 is a cross-sectional view of the two joined panels, as defined by section line 6-6 in FIG. 5.

Panel areas 26 of the various panels 21 form a majority or all of the portion of casing 20 that is visible on the exterior of sport ball 10. A majority of each flange area 27, however, is trimmed or otherwise removed from casing 20 and is generally absent from sport ball 10. Seams 22 are formed at the interface between panel area 26 and flange areas 27, so relatively small portions of flange areas 27 may remain in casing 20, particularly at seams 22. Referring to FIGS. 5 and 6, an example of the manner in which two panels 21 are joined to each other in an intermediate manufacturing step is depicted. Although panel areas 26 are generally co-planar with each other, the joined flange areas 27 bend upward and are secured to each other along abutting surfaces. Additionally, registration apertures 29 from each of the joined flange areas 27 are aligned. By aligning registration apertures 29 prior to bonding, flange areas 27 are properly positioned relative to each other.

A variety of techniques may be utilized to bond flange areas 27 to each other including, adhesive bonding and thermal bonding. Referring to FIGS. 3 and 6, for example, surfaces of inner layers 25 lay against each other and are bonded to each other to form one of seams 22. In adhesive bonding, an adhesive may be located between inner layers 25 of adjacent panels 21 to bond inner layers 25 to each other, thereby joining the adjacent panels 21 and forming one of seams 22. In thermal bonding, heat may be applied to panels 21 to bond inner layers 25 to each other, thereby joining the adjacent panels 21 and forming one of seams 22. As discussed in greater detail below, thermal bonding generally involves the use of a thermoplastic polymer material to form seams 22.

When exposed to sufficient heat, thermoplastic polymer materials transition from a solid state to either a softened state or a liquid state. When sufficiently cooled, thermoplastic polymer materials then transition back from the softened state or the liquid state to the solid state. Based upon these properties of thermoplastic polymer materials, thermal bonding processes may be utilized to form a bond that joins portions of panels 21 (i.e., flange areas 27) to each other. As utilized herein, the term "thermal bonding" or variants thereof is defined as a securing technique between two elements that involves a softening or melting of a thermoplastic polymer material within at least one of the elements such that the elements are secured to each other when cooled. Similarly, the term "thermal bond" or variants thereof is defined as the weld, link, or structure that joins two elements through a process that involves a softening or melting of a thermoplastic polymer material within at least one of the elements such that the elements are secured to each other when cooled.

Various examples of thermal bonding will now be discussed. In a first thermal bonding process, two adjacent panels 21 may each be at least partially formed from thermoplastic polymer materials. The adjacent panels 21 are placed in contact with each other and heated to induce the thermoplastic polymer materials to melt or soften. The thermoplastic polymer materials then intermingle with each other (e.g., diffuse across a boundary layer between the thermoplastic polymer materials) and are secured together when cooled, thereby forming one of seams 22. In a second thermal bonding process, one of two adjacent panels 21 may each be at least partially formed from a thermoplastic polymer material. The adjacent panels 21 are placed in contact with each other and heated to induce the thermoplastic polymer material to melt or soften. The thermoplastic polymer material then infiltrates crevices or cavities formed in the other panel 21, and the panels 21 are secured together when cooled. In a third thermal bonding process, inner layers 25 from two adjacent panels 21 may each be at least partially formed from textiles that are pre-bonded to layers of thermoplastic polymer materials. The inner layers 25 are placed in contact with each other and heated to induce the thermoplastic polymer materials to melt or soften. The thermoplastic polymer materials within the adjacent inner layers 25 intermingle with each other (e.g., diffuse across a boundary layer between the thermoplastic polymer materials) and are secured together when cooled. In a fourth thermal bonding process, inner layers 25 from two adjacent panels 21 are formed from textiles. A sheet of thermoplastic polymer material is placed between inner layers 25 and heated to induce the thermoplastic polymer material to melt or soften. The thermoplastic polymer material then extends around or bonds with yarns, filaments, and fibers within inner layers 25. Upon cooling, the thermoplastic polymer material effectively joins inner layers 25 to each other. Thermal bonding may, therefore, occur when both, one, or neither of panels 21 include thermoplastic polymer materials. Moreover, thermal bonding does not generally involve the use of stitching or adhesives, but involves directly bonding panels 21 to each other with heat. In some situations, however, stitching or adhesives may be utilized to supplement thermal bonding.

Figure 7:
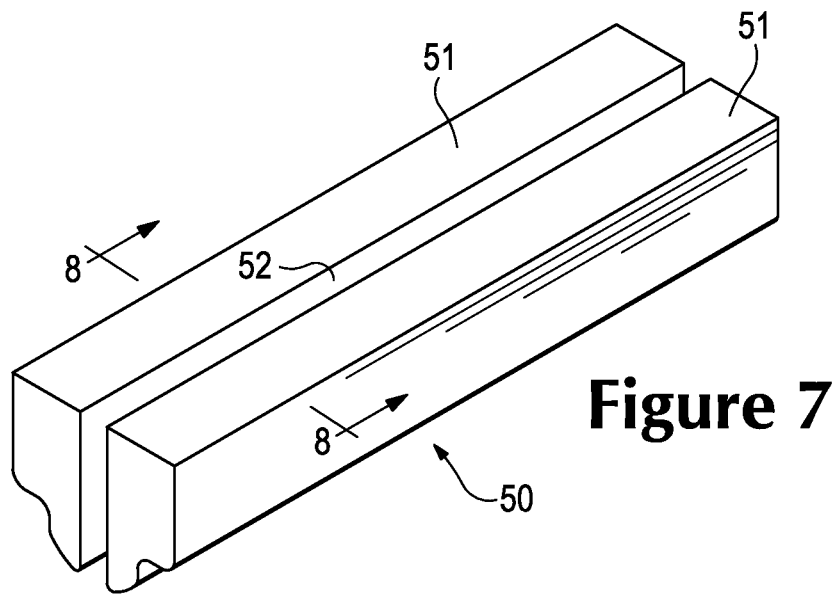
FIG. 7 is a perspective view of a bonding die utilized in joining the panels.
Figure 8:
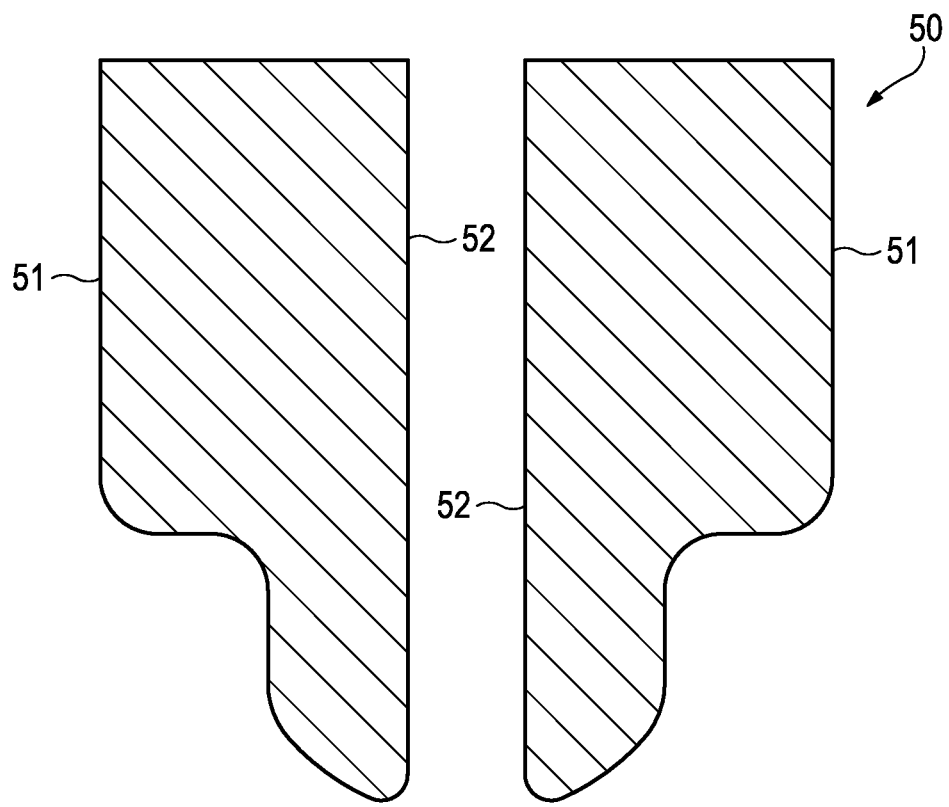
FIG. 8 is a cross-sectional view of the bonding die, as defined by section line 8-8 in FIG. 7.

A bonding die 50 that may be utilized to form seams 22 by bonding two flange areas 27 is depicted in FIGS. 7 and 8. Bonding die 50 includes two portions 51 that generally correspond in length with a length of one of the sides of panels 21. That is, the length of bonding die 50 is generally as long as or longer than the lengths of flange areas 27. Each portion 51 also defines a facing surface 52 that faces the other portion 51. That is, facing surfaces 52 face each other. If utilized for purposes of conduction heating, for example, portions 51 may each include internal heating elements or conduits that channel a heated liquid in order to sufficiently raise the temperature of bonding die 50 to form a thermal bond between flange areas 27. If utilized for purposes of radio frequency heating, one or both of portions 51 may emit radio frequency energy that heats the particular polymer material within panels 21. Another configuration of bonding die 50 may also heat flange areas 27 through ultrasonic heating. In addition to bonding die 50, a variety of other apparatuses that effectively form a thermal bond between panels 21 may be utilized.

Figure 9A:
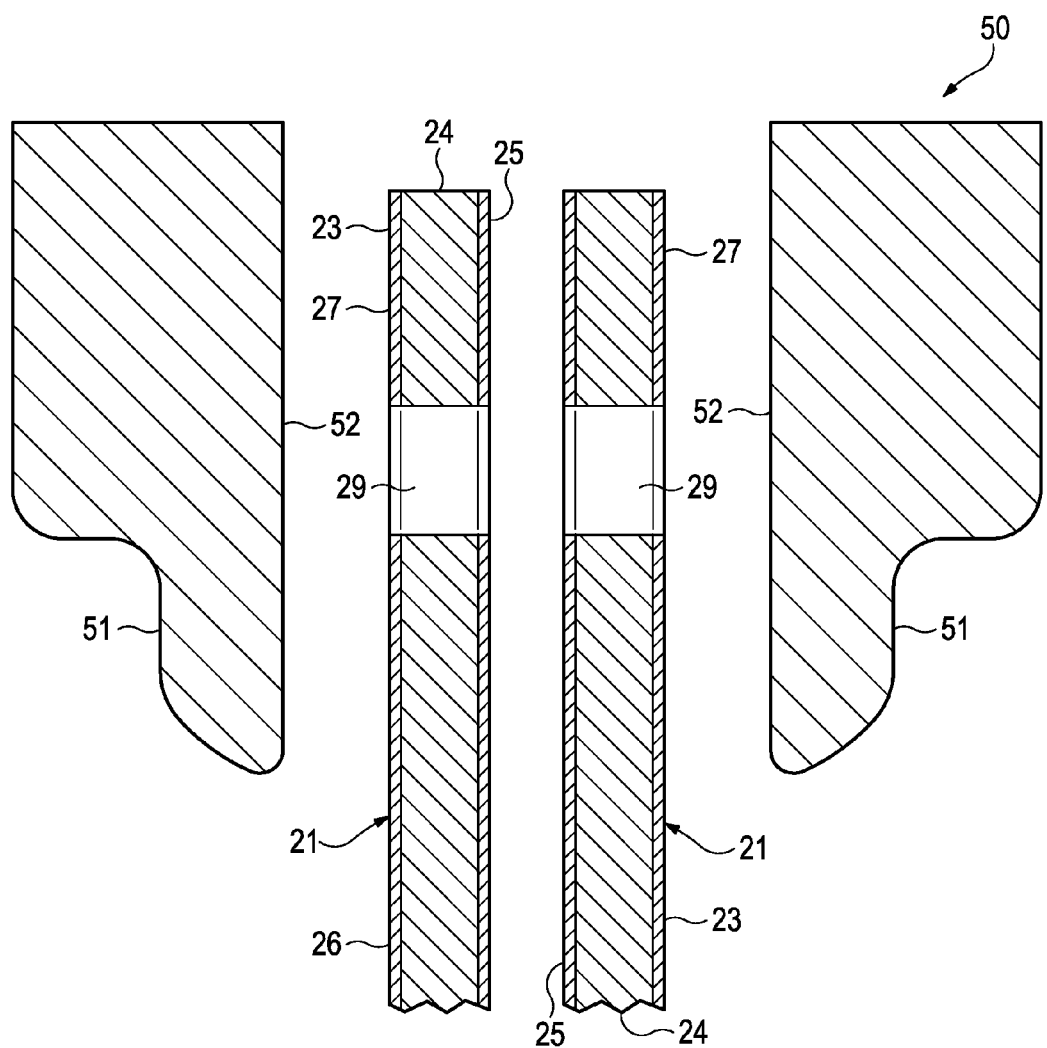
FIGS. 9A-9E are schematic cross-sectional views depicting steps of joining the panels together in a manufacturing process for the sport ball.
Figure 9B:
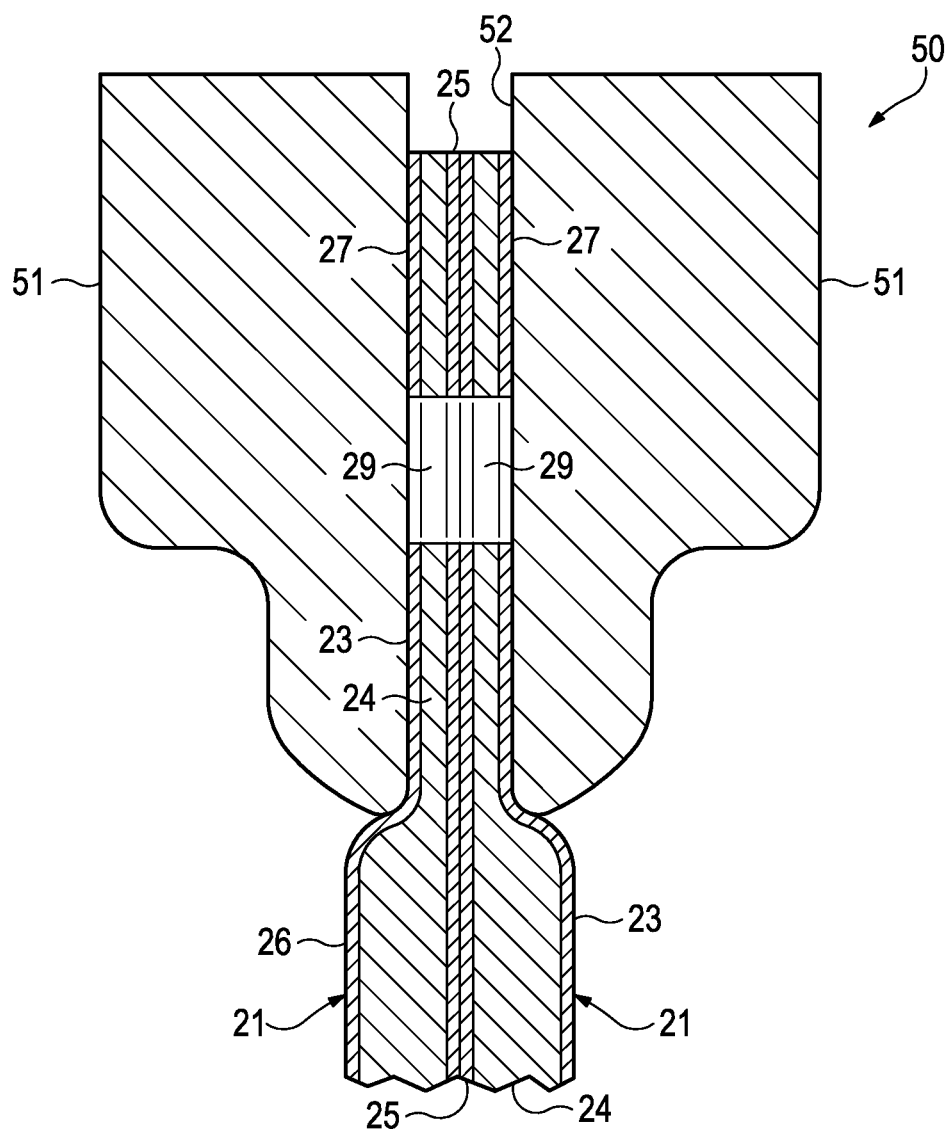

A general process for joining panels 21 with bonding die 50 will now be discussed with reference to FIGS. 9A-9E. Initially, two panels 21 are located such that (a) flange areas 27 are adjacent to each other, (b) surfaces of inner layers 25 face each other, and (c) registration apertures 29 are generally aligned, as depicted in FIG. 9A. Portions 51 of bonding die 50 are also located on opposite sides of flange areas 27. Referring to FIG. 9B, portions 51 then compress flange areas 27 together between facing surfaces 52 to cause surfaces of inner layers 25 to contact each other. By heating flange areas 27 with bonding die 50, the thermoplastic polymer materials within inner layers 25 melt or otherwise soften to a degree that facilitates thermal bonding between flange areas 27. By compressing flange areas 27 with bonding die 50, one or more of layers 23-25 also compress. For example, middle layer 24 may be formed from a polymer foam material, and the heat and compression from bonding die may compress middle layer 24 and effectively reduce the thickness of middle layer 24 in the area between portions 51.

In some configurations, inner layers 25 both incorporate thermoplastic materials that are heated during the step depicted in FIG. 9B. For example, inner layers 25 may be formed from sheets of thermoplastic polymer material, inner layers 25 may be textiles that are impregnated with thermoplastic polymer material (e.g., a polyester and cotton textile bonded to a thermoplastic polymer sheet), or inner layers 25 may be a textile having yarns formed from a thermoplastic polymer material. As noted above, however, thermal bonding may occur when both, one, or neither of panels 21 include thermoplastic polymer materials. As such, thermal bonding may occur when only one of inner layers 25 incorporates a thermoplastic polymer material. Moreover, in situations where neither of inner layers 25 incorporates thermoplastic polymer materials, a thermoplastic polymer element may be placed between panels 21 in FIG. 9A, and the thermoplastic polymer element may be compressed and heated between panels 21 in FIG. 9B, thereby forming a thermal bond that joins inner layers 25.

Figure 9C:
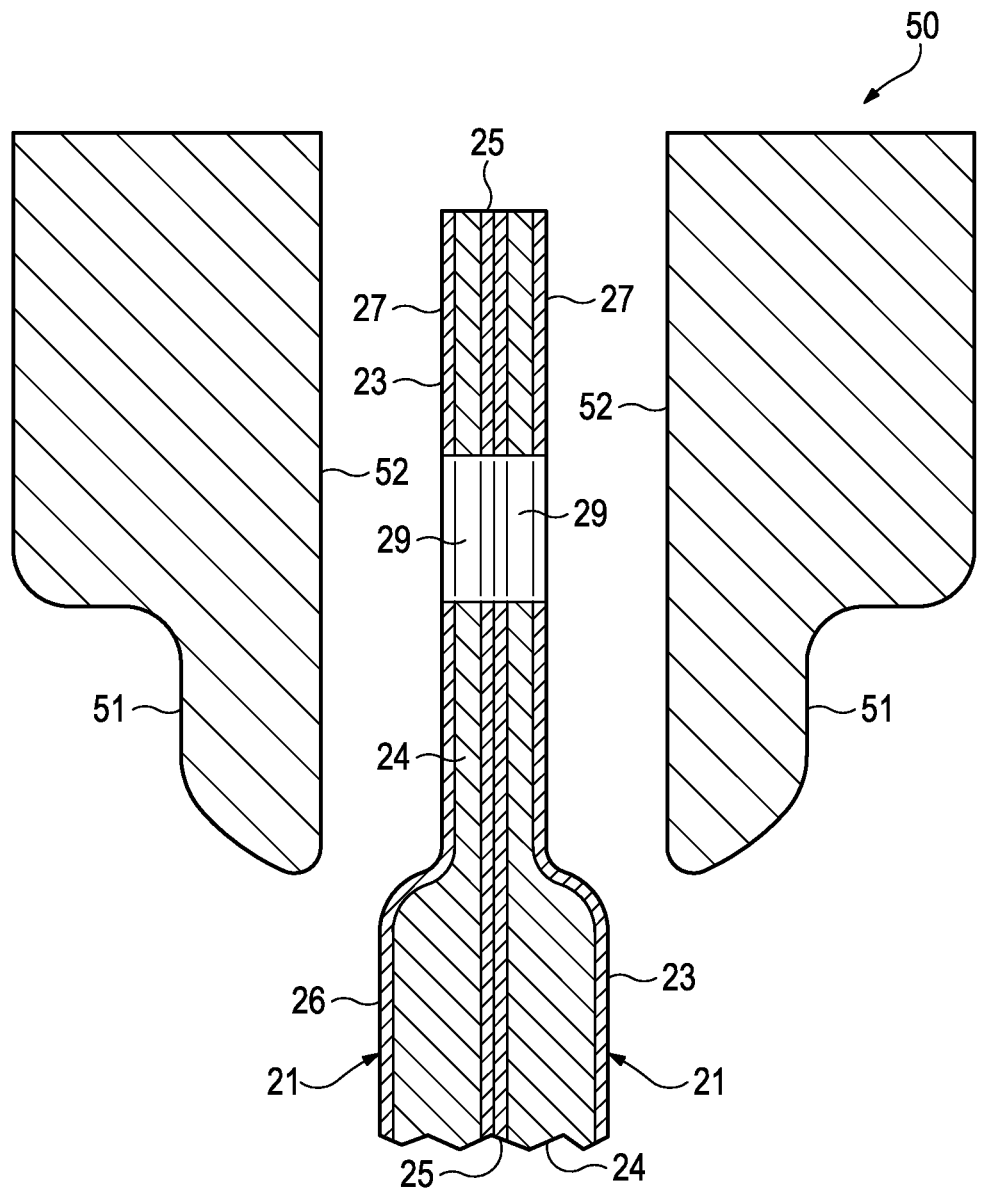
Figure 9D:
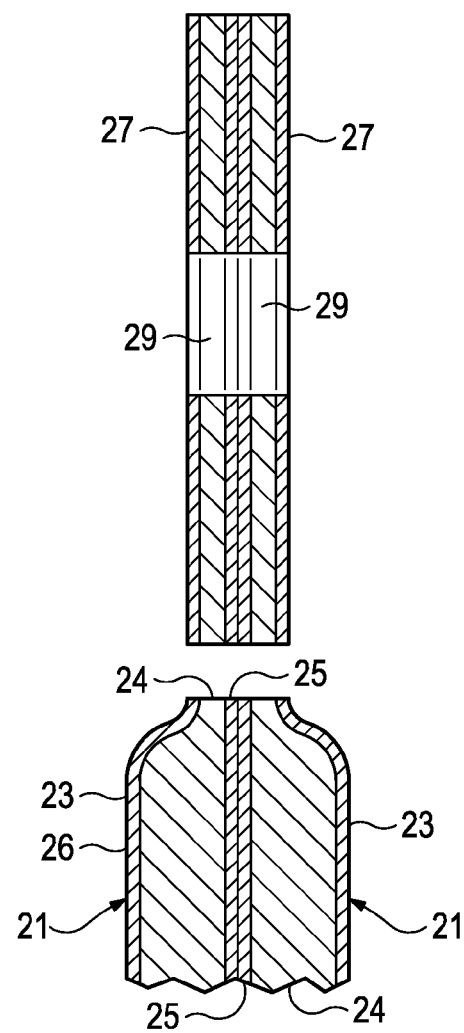
Figure 9E:
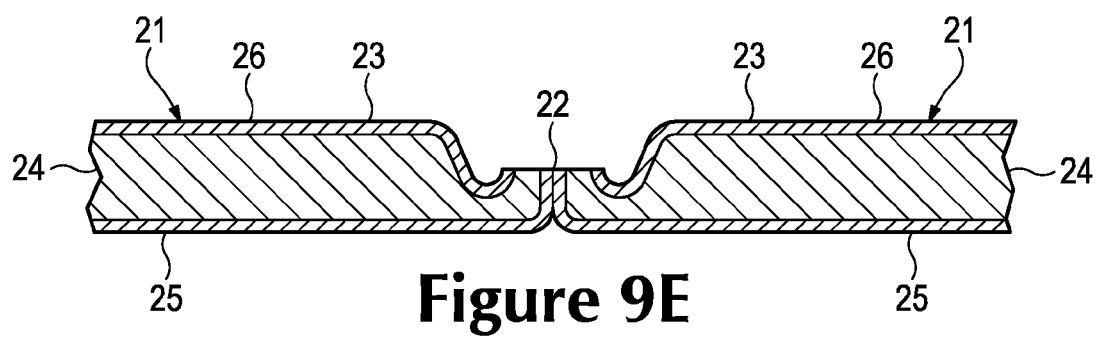

Following heating and compression, portions 51 separate and move away from panels 21, as depicted in FIG. 9C. At this stage, panels 21 are permitted to cool, thereby ensuring that the thermoplastic polymer material forming the thermal bond between inner layers 25 may solidify. Also, middle layer 24 generally remains compressed. More particularly, the heat and compression from bonding die 50 may melt portions of the polymer foam material of middle layer 24 or may collapse cells within middle layer 24 to retain the compressed configuration when portions 51 are separated. Excess portions of flange areas 27, which may include areas that define registration apertures 29, are then trimmed or otherwise removed, as depicted in FIG. 9D. The two panel areas 26 are then rotated or separated, as depicted in FIG. 9E, to reveal the formation of seam 22.

An advantage of the bonding process discussed above is that seam 22 is recessed below a majority of the outer surface of casing 20, which is formed by outer layer 23. Moreover, the edges of panels 21 that were trimmed following thermal bonding are also recessed below a majority of the outer surface of casing 20. This configuration effectively forms indentations between panels 21 and at seams 22. During the bonding process, bonding die 50 compressed panels 21 (e.g., compressed middle layer 24). Due to this compression, the thickness of panels 21 in the area of seam 22 is reduced, which permits seam 22 and the trimmed edges of panels 21 to form indentations and remain recessed below the outer surface of casing 20. In this configuration, panels 21 each have a lesser thickness adjacent to seam 22 than in areas spaced from seam 22.

Figure 10:
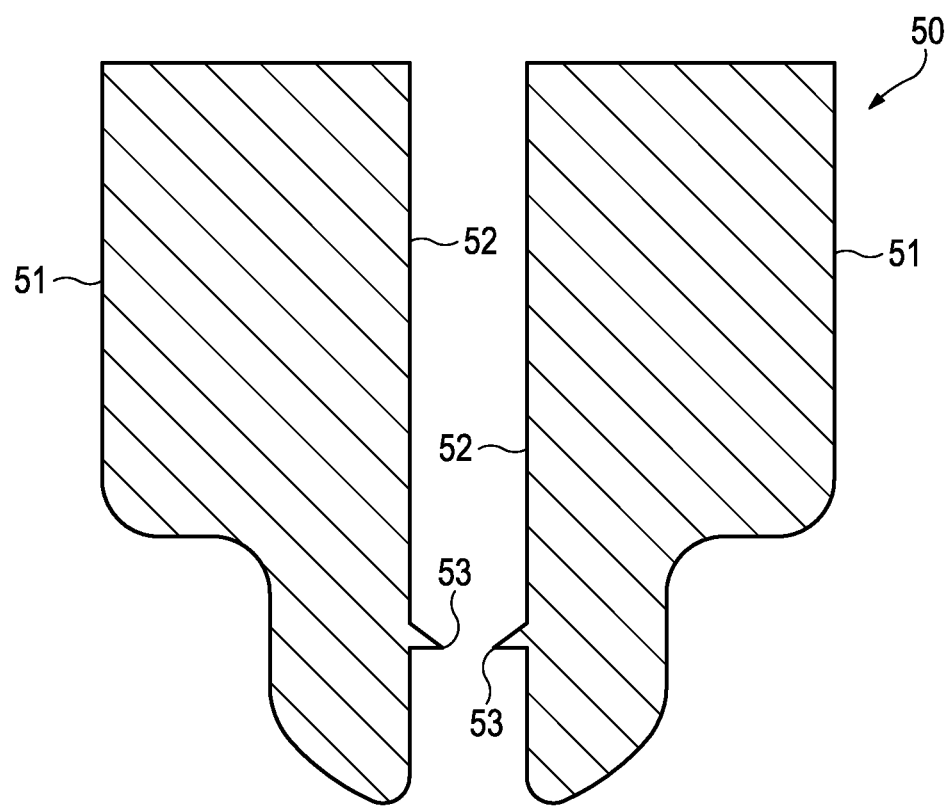
FIG. 10 is a cross-sectional view that corresponds with FIG. 8 and depicts another configuration of the bonding die.

A variety of trimming processes may be utilized to remove the excess portions of flange areas 27. As examples, the trimming processes may include the use of a laser cutting apparatus, a die cutter, a grinding wheel, or an etching process. As another example, bonding die 50 may incorporate cutting edges 53, as depicted in FIG. 10, that trim flange areas 27 during the bonding process. That is, cutting edges 53 may be utilized to simultaneously protrude through flange areas 27 and effectively trim flange areas 27 as portions 51 heat and compress flange areas 27 together between facing surfaces 52.

The bonding process disclosed in FIGS. 9A-9E forms seams 22 to have a configuration that effectively protrudes outward and toward an exterior of sport ball 10. Through the bonding process, inner layers 25, which form an interior surface of casing 20, lay against each other and are bonded to each other. That is, the interior surfaces of panels 21 lay against each other and are joined to each other to form seams 22, which have an outwardly-protruding configuration. Due to the compression of panels 21 (e.g., the compression in middle layer 24) in the areas where the bond is formed, as well as the trimming of excess portions of flange areas 27, seams 22 and the trimmed edges of panels 21 are recessed below a majority of the outer surface of casing 20.

As an additional matter, seams 22 formed through the bonding process discussed above have a configuration that exposes a portion of an edge of each panel 21 to the exterior of sport ball 10. That is, the edges of panels 21 form a portion of an outer surface of sport ball 10 and casing 20 at seams 22. Referring to FIG. 9E, for example, the areas of panels 21 that are trimmed exposes the edges of each of layers 23-25, thereby exposing edges of panels 21. An advantage of this configuration is that seams 22 may exhibit a unique aesthetic quality that distinguishes sport ball 10 from conventional sport balls.

Sport Ball Formation

Figure 11A:
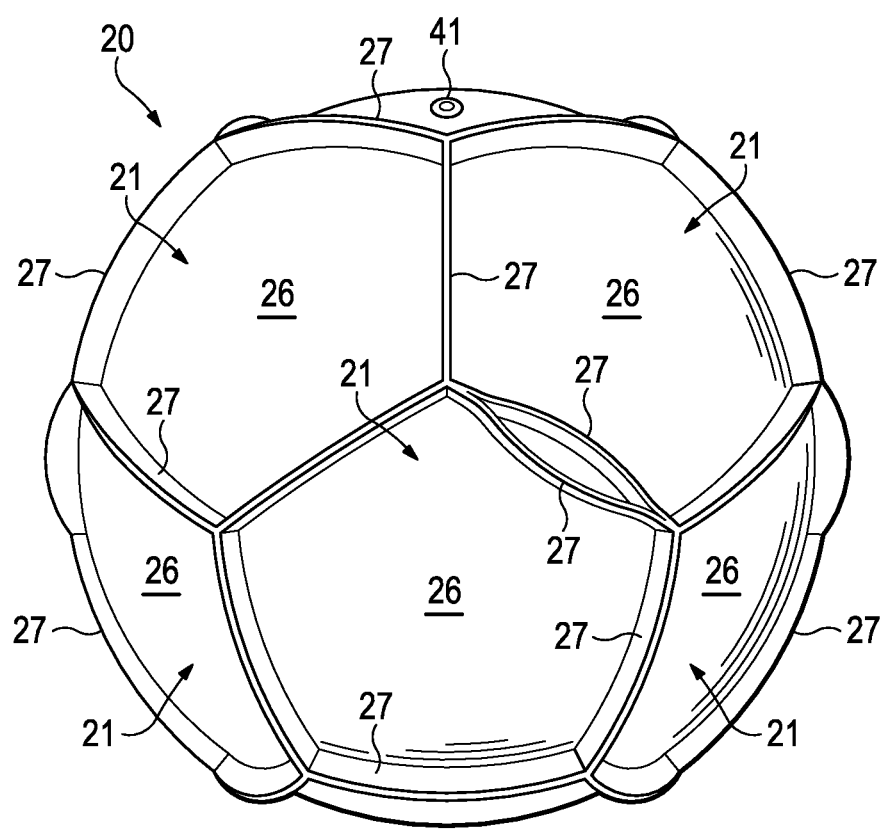
FIGS. 11A-11D are perspective views depicting further steps in the manufacturing process for the sport ball.
Figure 11B:
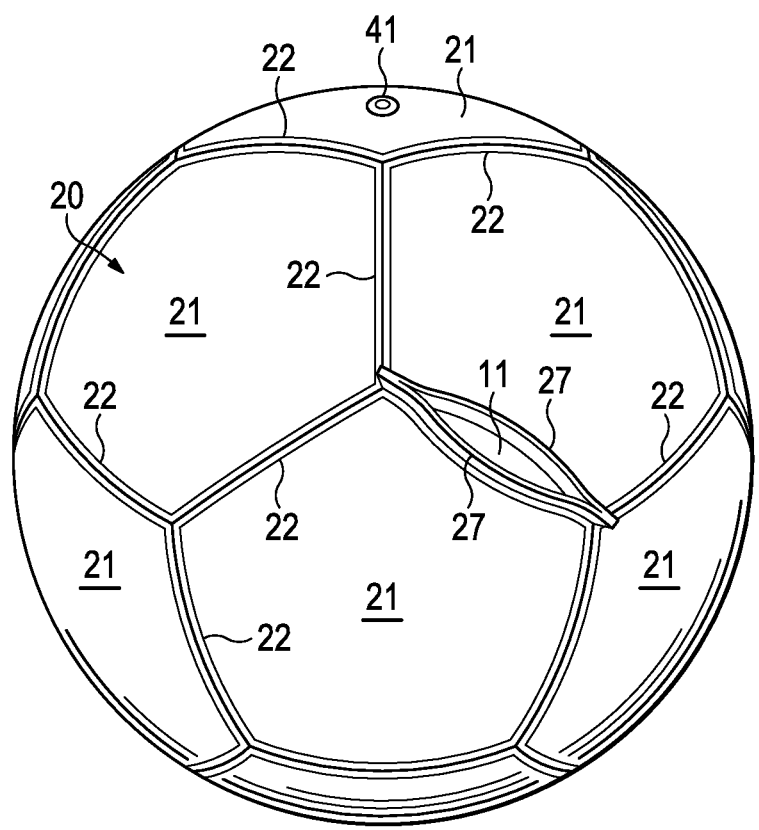

The general process of bonding flange areas 27 to form seams 22 between panels 21 was generally discussed above relative to FIGS. 9A-9E. This general process may be repeatedly performed with multiple panels 21 and on multiple flange areas 27 of each panel 21 to effectively form casing 20 to have a generally spherical or closed structure. More particularly, a majority of flange areas 27 from the various panels 21 in casing 20 may be bonded together to form the structure in FIG. 11A. Once bonded, excess portions of flange areas 27 may be trimmed to effectively complete the formation of seams 22, as depicted in FIG. 11B. In some processes, flange areas 27 may be trimmed immediately after forming each bond, rather than after forming each of the bonds between flange areas 27.

Figure 11C:
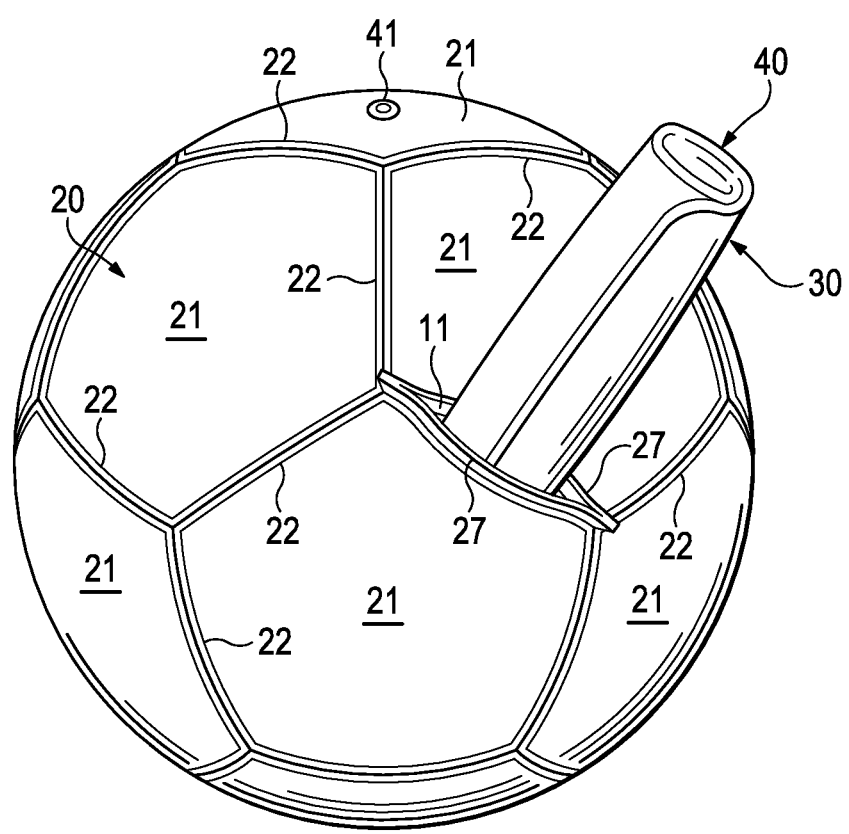
Figure 11D:
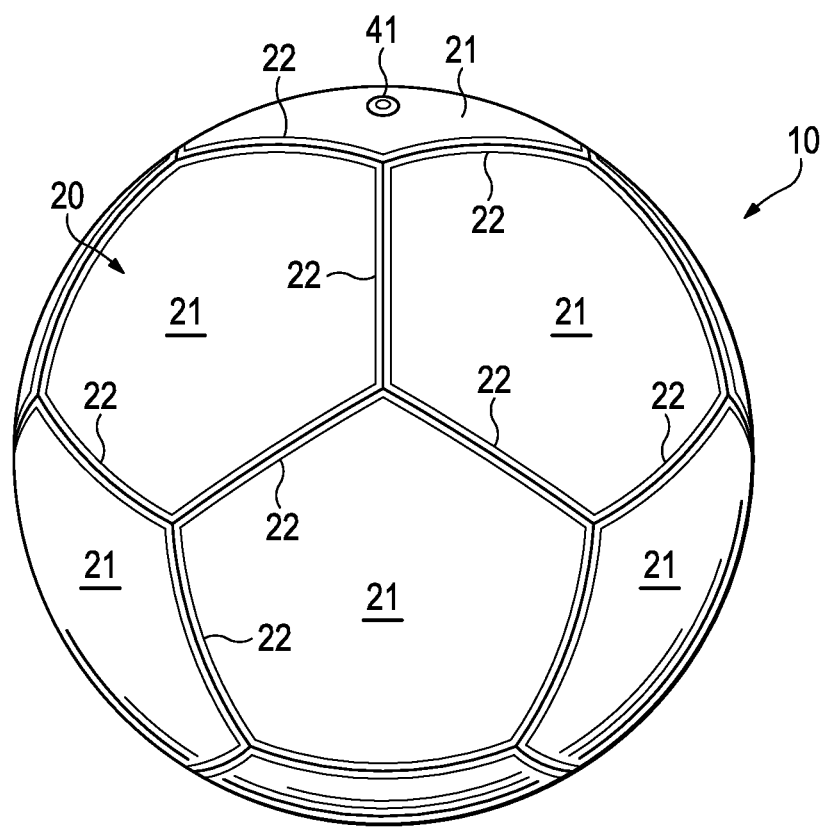

Although seams 22 are generally formed between each of flange areas 27, at least one of seams 22 may remain unbonded to each other at this stage of the manufacturing process. Referring to FIGS. 11A and 11B, two unbonded flange areas 27 form an opening 11 in casing 20. One purpose of leaving at least two flange areas 27 unbonded to each other, thereby forming opening 11, is that restriction structure 30 and bladder 40 may now be inserted into casing 20, as depicted in FIG. 11C. Once restriction structure 30 and bladder 40 are properly positioned, including placing valve 41 through an aperture in one of panels 21, the final two flange areas 27 may be bonded and trimmed to form the final seam 22, as depicted in FIG. 11D.

Based upon the above discussion, casing 20 may be at least partially formed by joining panels 21 through a bonding process. In comparison with other methods of joining panels, the bonding process may reduce the overall mass of sport ball 10 and increase manufacturing efficiency. Once the bonding process is utilized to join a majority of panels 21, opening 11 in casing 20 may be utilized to insert restriction structure 30 and bladder 40, and opening 11 is subsequently sealed by forming a final seam 22.

U.S. Patent Application Publication Number 2010/0240479 to Raynak, et al., which is incorporated herein by reference, discloses another process by which panels may be joined and a sport ball may be formed. As with the process discussed above, the process in the Publication involves (a) bonding panels to form seams of a casing, (b) inserting components into the casing through an opening in the casing, and (c) closing the opening by forming a final seam at a location of the opening. Although the bonding process discussed above may be utilized to form all seams in a sport ball (e.g., sport ball 10), the bonding process may also be utilized to form the final seam in the sport ball disclosed in the Publication. Accordingly, the bonding process disclosed herein may be applied to a variety of sport balls formed through various processes.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A sport ball comprising:
a casing that includes a plurality of panels having edge areas joined to each other with bonds, the edge areas projecting toward an exterior of the ball; and
a bladder located within the casing;
wherein the plurality of panels includes a first panel and a second panel joined to the first panel at a seam; and
wherein the first panel has a layered configuration that includes (a) a first layer forming a portion of an exterior surface of the first panel, (b) a second layer formed from a polymer foam material and having a lesser thickness adjacent to the seam than in areas spaced from the seam, and (c) a third layer forming a portion of an interior surface of the first panel.

2. The sport ball recited in claim 1, wherein an exterior surface of the casing defines indentations between the panels.

3. The sport ball recited in claim 1, wherein a restriction structure is located between the casing and the bladder.

4. The sport ball recited in claim 1, wherein the panels have a pentagonal shape.

5. The sport ball recited in claim 1, wherein the panels include a thermoplastic polymer material and the bonds are thermal bonds.

6. A sport ball comprising:
a casing including a first panel and a second panel that each have an exterior surface facing outward and an opposite interior surface facing inward, the interior surface of the first panel being bonded to the interior surface of the second panel to form a seam that joins the first panel and the second panel together; and
a bladder located within the casing;
wherein the first panel has a layered configuration that includes (a) a first layer forming a portion of the exterior surface of the first panel, (b) a second layer formed from a polymer foam material and having a lesser thickness adjacent to the seam than in areas spaced from the seam, and (c) a third layer forming a portion of the interior surface of the first panel.

7. The sport ball recited in claim 6, wherein at least one of the first panel and the second panel includes a thermoplastic polymer material that forms a thermal bond at the seam.

8. The sport ball recited in claim 6, wherein edges of the first panel and the second panel form a portion of an outer surface of the casing.

9. The sport ball recited in claim 6, wherein a restriction structure is located between the casing and the bladder.

10. The sport ball recited in claim 6, wherein the first panel and the second panel each have a lesser thickness adjacent to the seam than in areas spaced from the seam.

11. The sport ball recited in claim 6, wherein the polymer foam material includes collapsed cells in an area having the lesser thickness.

12. The sport ball recited in claim 6, wherein an exterior surface of the casing defines indentations between the panels.

13. A sport ball comprising:
a casing formed of a plurality of panels including a first panel and a second panel;
the first panel having a first exterior surface facing outward and a first interior surface facing inward opposite the first exterior surface;
the second panel having a second exterior surface facing outward and a second interior surface facing inward opposite the second exterior surface;
the first panel including a first edge and a first flange extending at the first edge;
the second panel including a second edge and a second flange extending at the second edge;
a bladder located within the casing, the bladder being configured to be inflated with a pressurized gas; and
a restriction structure located between the bladder and the casing, the restriction structure having a limited degree of stretch;
wherein the first flange and the second flange bend in an outward direction, the first flange and the second flange being bonded to each other thereby forming a seam between the first panel and the second panel;
wherein the first panel has a layered configuration that includes (a) a first layer forming a portion of the exterior surface of the first panel, (b) a second layer formed from a polymer foam material, and (c) a third layer forming a portion of the interior surface of the first panel; and
wherein the second layer has a first thickness in a first area adjacent to the seam and a second thickness in a second area spaced from the seam, the first thickness being less than the second thickness.

14. The sport ball recited in claim 13, wherein an exterior surface of the casing defines indentations between the panels.

15. The sport ball recited in claim 13, wherein the first flange and the second flange are bonded to each other by thermal bonding.

16. The sport ball recited in claim 15, wherein at least one of the first panel and the second panel includes a thermoplastic polymer material that forms a thermal bond at the seam.

17. The sport ball recited in claim 13, wherein the first panel and the second panel each have a lesser thickness adjacent to the seam than in areas spaced from the seam.

18. The sport ball recited in claim 13, wherein the polymer foam material of the second layer includes collapsed cells in the first area.

19. A sport ball comprising:
a casing formed of a plurality of panels, the panels having central portions and peripheral portions, the peripheral portions being joined to each other with bonds thereby forming seams of the sport ball;
a bladder located within the casing, the bladder being configured to be inflated with a pressurized gas; and
a restriction structure located between the bladder and the casing, the restriction structure having a limited degree of stretch;
wherein the peripheral portions of the plurality of panels include edges;
wherein the edges of the plurality of panels form portions of an outer surface of the sport ball at the seams;
wherein the casing has a layered configuration that includes (a) a first layer forming a portion of the exterior surface of the casing, (b) a second layer formed from a polymer foam material, and (c) a third layer forming a portion of the interior surface of the casing; and
wherein the second layer has a first thickness in first areas adjacent to the seams and a second thickness in second areas spaced from the seams, the first thickness being less than the second thickness.

20. The sport ball recited in claim 19, wherein the seams are recessed below a majority of the outer surface of the sport ball, forming indentations at the seams between the plurality of panels.

21. The sport ball recited in claim 19, wherein the panels are bonded to each other by thermal bonding.

22. The sport ball recited in claim 21, wherein the panels include a thermoplastic polymer material that forms thermal bonds at the seams.

23. The sport ball recited in claim 19, wherein the polymer foam material of the second layer includes collapsed cells in the first areas adjacent to the seams.

* * * * *